United States Patent [19]

Fukushima et al.

[11] 3,972,691

[45] Aug. 3, 1976

[54] METHOD FOR RECOVERING CHLORINE FROM CHLORINE-CONTAINING GASEOUS MIXTURES CONTAINING CARBON DIOXIDE AS ONE COMPONENT

[75] Inventors: Seitaro Fukushima, Omiya; Kiyoshi Kawahara; Yukio Sugawara, both of Musashino, all of Japan

[73] Assignee: Mitsubishi Kinzoku Kabushiki Kaisha, Japan

[22] Filed: May 28, 1974

[21] Appl. No.: 474,147

[30] Foreign Application Priority Data

May 31, 1973 Japan.............................. 48-61254

[52] U.S. Cl.......................................... 55/23; 55/71
[51] Int. Cl.² ..................................... B01D 53/00
[58] Field of Search .............. 55/71, 68, 69, 23; 423/500; 62/9, 11

[56] References Cited
UNITED STATES PATENTS

| | | | |
|---|---|---|---|
| 2,199,797 | 5/1940 | Hunter | 55/71 |
| 3,043,111 | 7/1962 | Schmidt et al. | 62/11 |
| 3,443,902 | 5/1969 | Tsao | 55/71 X |

FOREIGN PATENTS OR APPLICATIONS

| | | | |
|---|---|---|---|
| 571,214 | 1959 | Belgium | 62/9 |
| 686,569 | 1964 | Canada | 62/9 |
| 1,266,738 | 1968 | Germany | 423/500 |
| 938,073 | 1962 | United Kingdom | 62/9 |
| 1,164,069 | 1968 | United Kingdom | 423/500 |

*Primary Examiner*—John Adee
*Assistant Examiner*—Ethel R. Cross
*Attorney, Agent, or Firm*—Wenderoth, Lind & Ponack

[57] ABSTRACT

A method for recovering chlorine from a chlorine-containing gaseous mixture containing carbon dioxide which comprises the steps of cooling said mixture in a rectification column of total-reflux type to prepare liquid chlorine, then subjecting the liquid chlorine to temperature control, whereby liquid chlorine of high purity is recovered in high yield.

4 Claims, 4 Drawing Figures

METHOD FOR RECOVERING CHLORINE FROM CHLORINE-CONTAINING GASEOUS MIXTURES CONTAINING CARBON DIOXIDE AS ONE COMPONENT

BACKGROUND OF THE INVENTION

This invention relates to a method for recovering high purity chlorine in high yield from a chlorine gaseous mixture containing carbon dioxide as one component thereof. More particularly, this invention relates to a method for recovering chlorine as substantially pure liquid chlorine by a rectification operation of total-reflux type for a cooling process and by controlling the temperature of the liquid chlorine stored in the bottom of a rectification column to release carbon dioxide dissolved in the liquid chlorine.

Various methods for recovering chlorine from chlorine-containing gases have been proposed with respect to the chlorine liquefying process in brine electrolysis for the production of chlorine and to further treatment of its waste gas, examples of these proposals being as follows.

1. U.S. Pat. No. 2,540,905 describes a method for recovering chlorine substantially free from carbon dioxide from the waste gas of brine electrolysis, which contains 10 to 25% of chlorine as well as $CO_2$, $CO$, $H_2$, $N_2$ and $O_2$, by absorbing chlorine with a suitable chlorinated hydrocarbon solvent, such as heptachloropropane, and simultaneously desorbing the absorbed carbon dioxide at different temperatures.

2. British Pat. No. 798,576 also describes a method for stripping chlorine by controlling the $CO_2$ partial pressure in the chlorine liquefying waste gas of brine electrolysis below 1.5 atm under compression to absorb chlorine in water at 10° to 100°C and then heating the resulting solution under reduced pressure.

3. H. Hagemann (Chemie Ing. Tech. 39, 744–747 (1967)) describes a method for achieving the chlorine liquefaction in high yield by blowing compressed cell gas (anode chamber gas) of brine electrolysis into liquid chlorine to purge carbon dioxide dissolved in the liquid chlorine and recycling the purged carbon dioxide with the cell gas into the liquefying step to avoid the explosion accompanying stored hydrogen when liquefying the cell gas of brine electrolysis. Concerning the methods of the above references (1) and (2), however, they are not economical, because the absorption or adsorption techniques, as tools for separating chlorine from the chlorine containing gaseous mixtures, deal essentially with dilute chlorine, whereas, in the industrial treatment of the chlorine-containing gas, in which the chlorine concentration amounts to 50% or more, it is necessary to use a large quantity of absorbents or adsorbents and, moreover, to set up processes for desorbing and recovering of chlorine from these absorbents and adsorbents. As for the method of the above reference (3), the quantity of carbon dioxide contained in the cell gas of an ordinary brine electrolysis ranges only from about 0.5 to 1.5% by volume, so that it does not cause trouble in practical use, even if all of the carbon dioxide dissolves in the liquid chlorine. Further, when the carbon dioxide concentration in the cell gas is, say, 0.6%, and if it is enriched by the addition of carbon dioxide purged from liquid chlorine, its concentration in the cell gas increases to only about 1%, whereby there is no need to control the residual carbon dioxide in the liquid chlorine.

SUMMARY OF THE INVENTION

Accordingly, it is an object of this invention to overcome the afore described difficulties encountered in the prior art.

A specific object of this invention is to provide a method for recovering high purity chlorine in high yield from chlorine-containing gaseous mixtures containing carbon dioxide as one component.

According to this invention, these and further objects can be accomplished by providing, in a method for recovering chlorine from a chlorine-containing gaseous mixture containing carbon dioxide as one component thereof which comprises the steps of compressing and subsequent cooling the mixture, an improvement wherein the cooling of the compressed mixture is carried out in a rectification column of total-reflux type to prepare and store in the bottom of the column liquid chlorine, dissolving therein the carbon dioxide, and the liquid chlorine is subjected to temperature control to release therefrom the carbon dioxide dissolved therein.

The nature, principle, and details of the invention will be more clearly apparent from the following detailed description, when read in conjunction with the accompanying drawing.

DETAILED DESCRIPTION

This invention provides a method for recovering pure chlorine suitable for many applications economically from gaseous mixtures such as a $Cl_2$—$CO_2$ system, in which both $CO_2$ and $Cl_2$ do not exist rarely but more abundantly, for example, 50% $Cl_2$–50% $CO_2$, a $Cl_2$—$CO_2$ binary system of all possible composition ratios wherein the concentration of $Cl_2$ is, for example, 90 to 20% and the concentration of $CO_2$ is, for example, 5 – 10 to 80%, or a gaseous mixture containing $N_2$, $O_2$, $CO$ or any other additional gases. This invention concerns chlorine-containing gaseous mixtures containing carbon dioxide as one component, in which the chlorine concentration is not as high as that in the cell gas of brine electrolysis, and the carbon dioxide content exceeds a range of protective gas in the liquefaction of the cell gass.

Figure 1:
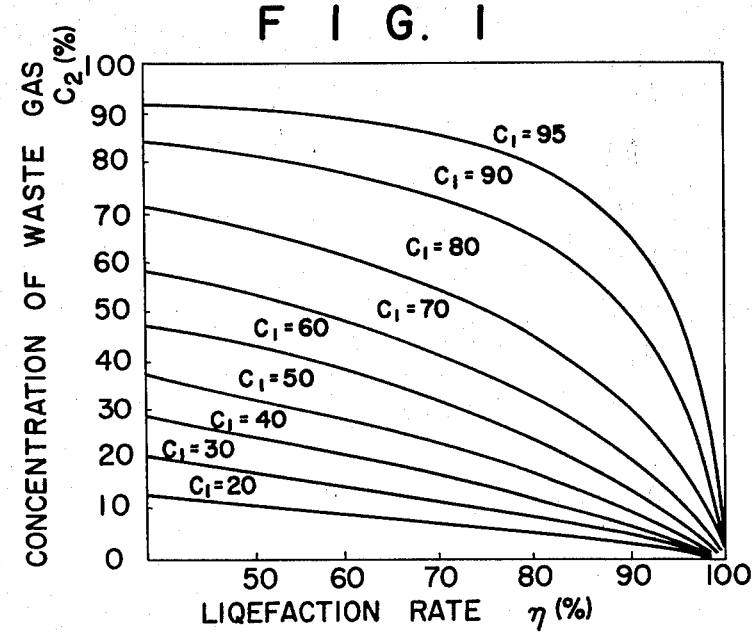
FIG. 1 is a graph showing relationships between liquefaction rate or efficiency of chlorine and chlorine concentration in the waste gas for different given chlorine concentrations in the feed gas.
Figure 2:
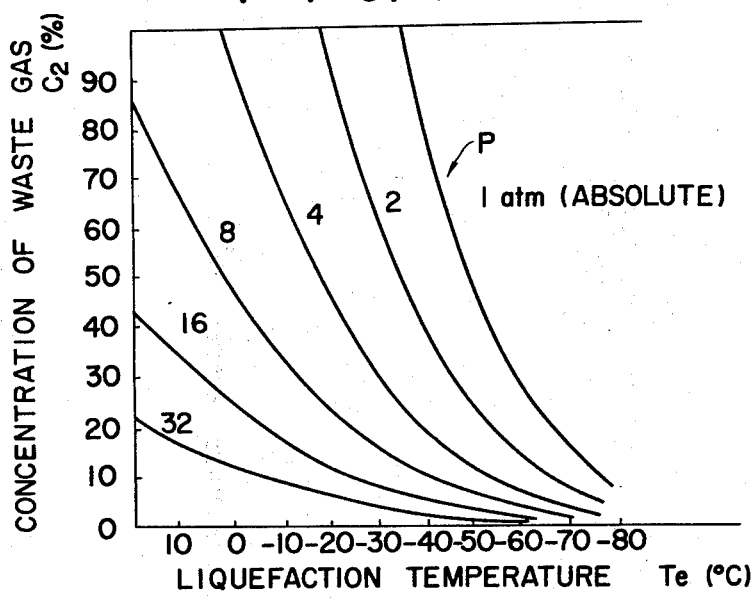
FIG. 2 is a graph showing relationships between the liquefaction temperature and chlorine concentration in the waste gas for different pressure for compression.

On the other hand, as to the liquefaction of chlorine, the relationships between chlorine concentration in the chlorine-containing gaseous mixture $C_1(\%)$, that in the waste gas $C_2(\%)$, and the liquefaction efficiency of chlorine $\eta(\%)$ is shown in FIG. 1. In FIG. 1, when $C_1$ is high, $\eta$ stands at a higher level even if $C_2$ increases, but if $C_1$ decreases, it is necessary to keep $C_2$ lower in order to obtain large $\eta$. According to FIG. 2, $C_2$ is also restricted by the compressive pressure P (absolute pressure) and the liquefaction temperature Te(°C). That is, it is necessary to keep the chlorine concentration in the waste gas lower by increasing either the compressive pressure or the degree of cooling in order to liquefy and recover chlorine in high liquefaction efficiency from the chorine-containing gaseous mixtures of low chlorine concentration.

Figure 3:
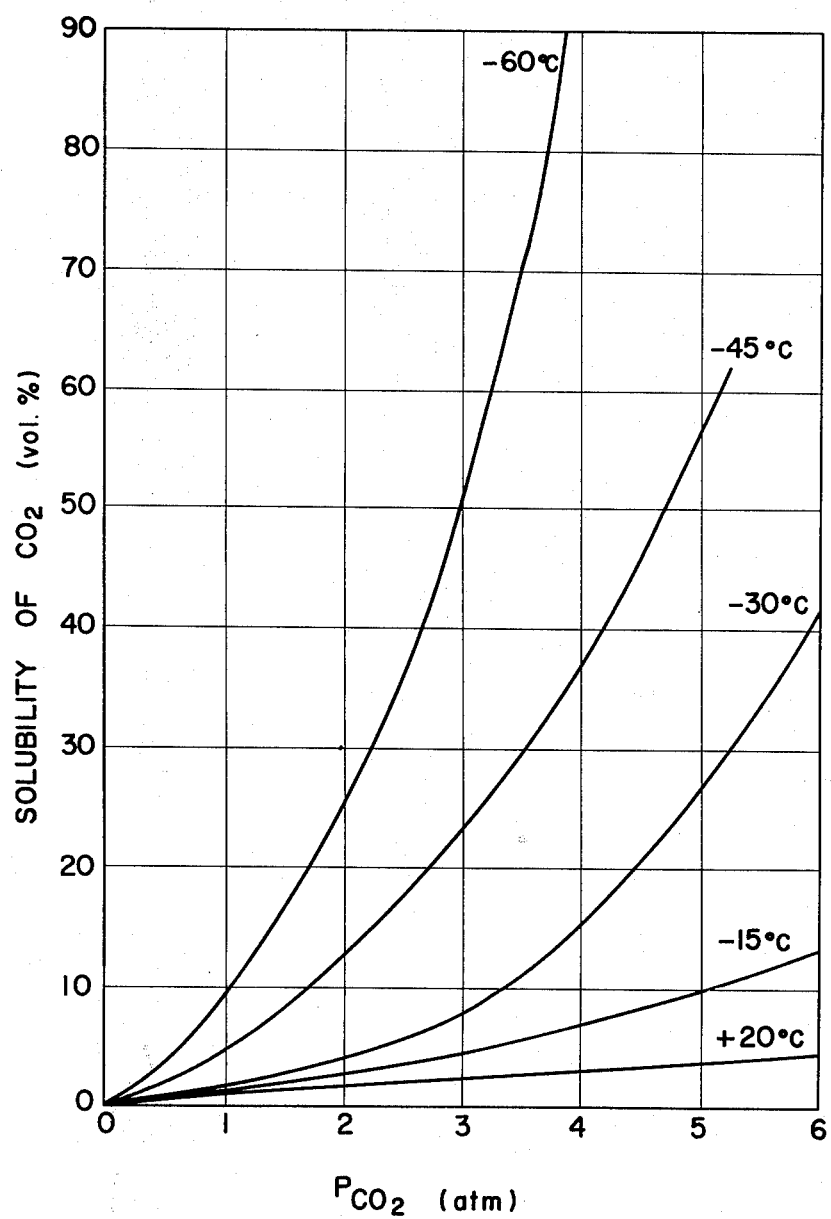
FIG. 3 is a graph showing relationships between the partial pressure of carbon dioxide and solubility of carbon dioxide in liquid chlorine at different temperatures.

However, it is technically difficult to compress the chlorine containing gas to 10 atm (absolute pressure) or more at the present technical level. Therefore two conditions, i.e., compression and cooling, are required for liquefying chlorine of low concentration. In this case, if some components such as nitrogen and oxygen are present in addition to chlorine, there will be no problem since they dissolve with difficulty in liquid chlorine, but in the case of carbon dioxide, it is impossible to separate the chlorine and the carbon dioxide by simple compressing and cooling since the solubility of carbon dioxide in liquid chlorine increases rapidly both with increase in the partial pressure of the carbon dioxide in the residual gas and decrease in the cooling temperature, as shown in FIG. 3. Further, another condition which restricts the liquefaction and separation of chlorine in the chlorine gaseous mixture containing carbon dioxide as one component is the possibility of depositing of the carbon dioxide as solid at $P_{CO_2} = 5.1$ atm abs and $Te = -56.6°C$ and of causing the blocking of the apparatus of the chlorine liquefaction process.

The compressive pressure and the cooling degree as condition of the chlorine liquefaction of this invention may be determined by the chlorine concentration of the gaseous mixture and a desired chlorine liquefaction degree, but they are substantially restricted by the limiting conditions under which, simultaneously, the compressing pressure is so controlled that the partial pressure of the carbon dioxide does not exceed 5.1 atm abs in the chlorine liquefacting process, and the cooling temperature at that time is prevented from exceeding $-56.6°C$. Of course, when the partial pressure of carbon dioxide in the course of the chlorine liquefaction is less than 5.1 atm abs, it is possible to cool below $-56.6°C$.

Figure 4:
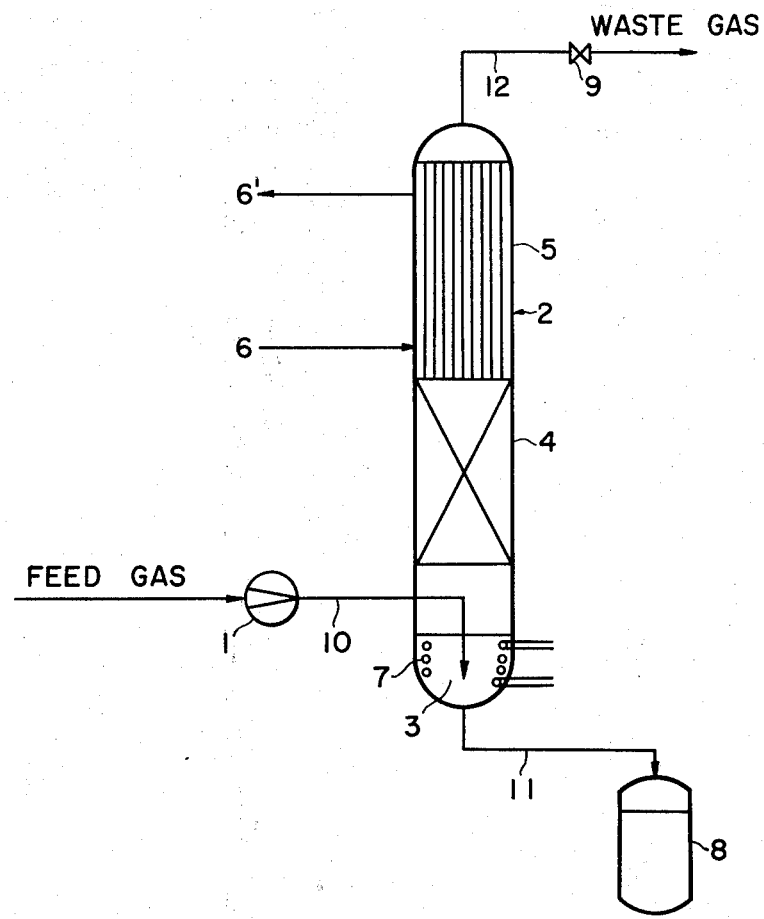
FIG. 4 is a schematic diagram showing one example of an apparatus suitable for the practice of the method of the invention.

An illustrative apparatus suitable for use in the practice of the present process is shown in FIG. 4. Referring to FIG. 4, 1 is a compressor, 2 is a rectifying column, 3 is a reboiler section for liquid chlorine, 4 is a tray type or packing type rectifying section, and 5 is a heat exchanger for chlorine condensation. Either a method in which a refrigerant such as a fluorinated hydrocarbon, e.g. Freon is fed from an inlet for refrigerant liquid 6, and the vapor of this refregerant is led out from an outlet for refrigerant vapor 6', i.e., a direct expansion method, or a method in which an alcoholic or calcium chloride type refrigerant is recycled may be employed. 7 is a heat exchanger for controlling the temperature of liquid chlorine in the reboiler section 3.

Liquid chlorine is discharged from the bottom of the reboiler section 3 and led to a chlorine reservoir through a liquid chlorine discharging pipe 11. On one hand, the waste gas from the top of the rectifying column flows upwardly through a waste gas leading pipe 12 and is discharged through a pressure regulating valve 9 while the pressure in the rectifying column 2 is maintained constant. The feed of the chlorine gaseous mixture is ordinarily compressed to 4 to 8 atm in the compressor according to the chlorine concentration and blown into liquid chlorine in the reboiler section 3 through the pipe 10, whereby the liquid chlorine is stirred, the temperature is maintained uniformly, and the desorption of the dissolved carbon dioxide is accelerated.

In the course of moving up in the rectificating section 4, the feed gas blown into the reboiler section 3 contacts the downward flow of the liquid chlorine from the condensation section 5, and material exchange and heat exchange are achieved, which are represented by the condensation of chlorine in the feed gas and the desorption of carbon dioxide in liquid chlorine. Proceeding further upward, the feed gas reaches the condensation section 5, where chlorine is liquefied and separated according to the degree of liquefaction restricted by the temperature and the pressure of the condensation section 5. The residual gas, which consists of a major part of carbon dioxide and a minor part of non-condensable nitrogen as well as oxygen and a part of chlorine are discharged from the top of the rectificating column through the pipe 12 and the pressure regulating valve 9. The above mentioned part of chlorine corresponds to the partial pressure of chlorine which is equilibrated with the liquid chlorine under the conditions of the condensation section 5.

Thus, the section 5 should have sufficient heat exchanging area to cool the feed gas to a prescribed temperature. Further, the number of theoretical plates may be estimated to be about three, although the number required for the rectificating section 4 cannot be calculated exactly since data on vapor-liquid equilibrium for a $Cl_2$–$CO_2$ binary system have not been reported. The rectificating section, therefore, should have at least 3 plates or more, or a corresponding packing section.

The temperature of the liquid chlorine in the reboiler section 3 is determined by amount of carbon dioxide permissible in recovered chlorine. However, the heat exchanger of the reboiler section 3 may be controlled so that the temperature will be as low as possible in the allowable range of carbon dioxide concentration. The higher the temperature at which the reboiler is maintained, the higher is the purity of the liquid chlorine obtained. However, this is not economical since it is necessary to increase the quantity of heat for heating liquid chlorine and to remove excess quantity of heat added.

The controlled temperature in the reboiler section 3 is preferably in a range of 0° to 15°C for the ordinary purpose of recovering chlorine. When heating to a higher temperature, the vapor pressure of chlorine in the reboiler section 3 increases to an extent corresponding to the compressive pressure, and thus it is necessary to further increase the compressive pressure. Many kinds of heat sources such as steam, hot water, heated gas, and electric heat may be used and are not restricted by their kinds. However, a sufficiently large heat exchanging area should be provided to avoid the occurrence of even a single part where its temperature exceeds the resistance limit for chlorine.

As described hereinabove, this invention provides the method for liquefying and recovering liquid chlorine in which the feed gas is compressed and led to the rectification column of total-reflux type to rectify and separate carbon dioxide dissolved in liquid chlorine, and liquid chlorine is separated and recovered. The solubility of carbon dioxide in liquid chlorine is restricted finally to an extent such that liquid chlorine is preferably used for its required purpose. Further, this makes it possible to recover chlorine with high purity and in high recovery yield from the chlorine gaseous mixture of a $Cl_2$–$CO_2$ binary system or that of wide range of compositions containing $N_2$, $O_2$, CO, etc.

The following examples are given by way of illustration but are not to be construed to limit the scope of this invention.

COMPARATIVE EXAMPLE

The apparatus used in this comparative example is as shown in FIG. 4. The main specifications are as follows;

Compressor:
  oil-less reciprocating two-stage compression type
    discharge pressure          7 atm
    capacity of the compressor  80 m³/hr
    actual flow rate            52 m³/hr
Rectificating column:
  vertical cylindrical type (provided with
  external heat insulation)
    condenser                   400 mm diam.,
                                length 3,500 mm
                                cooling area 31.3 m³
    packed section              400 mm diam.,
                                length 2,000 mm
    reboiler section            500 mm diam.,
                                length 1,500 mm
  (hot water recycling coil type heating)
Refrigerator for cooling the condenser:
  high-speed multi-cylinder two-stage compression type
    refrigerant used            A fluorinated hydrocarbon
                                corresponding to "Freon R-22"
    refrigerating capacity      6,500 kcal/hr (–65°C)

Using the above specified apparatus, a chlorine gaseous mixture consisting of 52.6% of $Cl_2$, 43.2% of $CO_2$ and 4.2% of air, all by volume, dried by a sulfuric acid column was compressed to 6 kg/cm², gauge, (ca. 6.8 atm, absolute pressure) by means of the compressor and blown into liquid chlorine in the bottom of the rectification column. The condenser of the rectificating column had been precooled the roughly by operating the refrigerator. When chlorine was liquefied from the blown chlorine gaseous mixture, and the recovered liquid chlorine was accumulated to a prescribed level, the liquid chlorine was taken out and stored in the reservoir maintaining the prescribed level.

On the other hand, the waste gas was discharged through the pressure regulating valve, while the pressure in the rectification column was kept at 6 kg/cm², gauge. While the flow of the chlorine gaseous mixture passed into the condenser was maintained at a constant flow rate of the $Cl_2$ at 10.65 mole/min., $CO_2$ at 8.75 mole/min. air at 0.85 mole/min., for a total of 20.25 mole/min. in the composition, the operation was continued for 10 hours without heating of the liquid chlorine stored in the reboiler. The results obtained in the steady state are as follows.

| | |
|---|---|
| Temperature of discharge gas from compressor | 95°C |
| Temperature of inlet gas into rectification column | 30°C |
| Temperature of outlet gas from rectification column | –51°C |
| Temperature of liquid chlorine in reboiler section | –32°C |
| Gas composition at top of rectification column | |
| $Cl_2$    7% by vol. | |
| $CO_2$   62% by vol. | |
| air       31% by vol. | |
| Composition and volume of recovered liquid chlorine | |
| $Cl_2$    59.8% by vol.  10.45 mole/min. | |
| $CO_2$    40.2% by vol.  7.04 mole/min. | |

As shown hereinabove, these results clarify the fact that the rectification effect could not be obtained. This is attributable to the standing liquid chlorine without heating, whereby the conditions are similar to those achieved by conventional simple compressing and cooling. The recovered chlorine was contaminated by 40.2% by volume of carbon dioxide (% by volume obtained when vaporizing). Liquid chlorine at a concentration as low as that in the feed gas composition was recovered.

EXAMPLE I

Using the same apparatus as in the Comparative Example, the same procedure was repeated except for keeping the liquid chlorine stored in the reboiler at 10°C by recycling hot water through the heat exchanger. As the feed of the chlorine gaseous mixture, the composition of the comparative example was treated at the same blowing rate, and the operation was continued for 12 hours. The results obtained in the steady state are as follows.

| | |
|---|---|
| Temperature at top of rectification column | –52°C |
| Temperature of liquid chlorine in reboiler section | 9°C |
| Gas composition at the top of the rectification column | |
| $Cl_2$    5.3% by vol. | |
| $CO_2$   86.1% by vol. | |
| air        8.6% by vol. | |

The composition of the removed liquid chlorine was 97.5% by volume of $Cl_2$ and 2.5% by volume of $CO_2$; and the liquefaction efficiency of chlorine was 95.1%.

EXAMPLE II

A chlorine feed gas consisting of 30% by volume of $Cl_2$, 25% by volume of $CO_2$, 30% by volume of $N_2$, and 15% by volume of $O_2$ was blown into the apparatus of the Comparative Example. The gas was compressed to 6 kg/cm², gauge, and the temperatures of the waste gas at the top of the rectification column and of the liquid chlorine in the reboiler section were controlled a –55°C and 11°C, respectively. The composition of the waste gas from the top of the rectificating column contained 5% by volume of $Cl_2$, 28% by volume of $CO_2$ and 67% by volume of $N_2+O_2$. The recovered liquid chlorine contained 2.2% by volume of carbon dioxide (% by volume obtained when the liquid chlorine was vaporized). The liquefaction efficiency of the chlorine was about 90%.

EXAMPLE III

A chlorine gaseous mixture comprising 82% by volume of $Cl_2$ and 18% by volume of $CO_2$ was processed in a steady state in the apparatus of the Comparative Example under the following conditions.

| | |
|---|---|
| Compressive pressure: | 6 kg/cm² (gauge pressure) |
| Temperature of waste gas at top of rectification column: | –45°C |
| Temperature of liquid chlorine in reboiler section: | 5°C |

The waste gas composition at the top of the rectification column was 9% by volume of $Cl_2$ and 91% by volume of $CO_2$. Carbon dioxide present in the recovered liquid chlorine was 0.8% by volume (% by volume obtained when the liquid chlorine was vaporized), and the liquefaction efficiency of the chlorine was about 98%.

EXAMPLE IV

A chlorine gaseous mixture comprising 29% by volume of $Cl_2$ and 71% by volume of $CO_2$ was processed in a steady state in the apparatus of the Comparative Example under the following conditions.

| Compressive pressure: | 6 kg/cm² (gauge pressure) |
|---|---|
| Temperature of waste gas at top of rectification column: | −52°C |
| Temperature of liquid chlorine in reboiler section: | 10°C |

The waste gas composition at the top of the rectification column was 7% by volume of $Cl_2$ and 93% by volume of $CO_2$. Carbon dioxide present in the recovered liquid chlorine was 3.7% by volume (% by volume obtained when the liquid chlorine was vaporized) and the liquefaction rate of chlorine was about 85%.

We claim:
1. In a method for recovering chlorine from a chlorine-containing gaseous feed mixture, also containing another gaseous component including carbon dioxide, by means of liquification, which method comprises:
   a. compressing the gaseous feed mixture; and
   b. cooling the compressed gaseous feed mixture to substantially liquefy chlorine and separate same from said another gas component;
   the improvement which comprises:
   performing said compression of said feed mixture at a pressure such that the partial pressure of carbon dioxide in said gaseous mixture is kept not higher than 5.1 atm. absolute in the course of the liquification;
   introducing the compressed gaseous mixture into a rectification column of the total reflux type comprising a condenser and a bottom structure, said bottom structure being adapted to receive and control the temperature of liquid chlorine, and
   performing said cooling of said compressed gas mixture by means of said condenser, said condenser being regulated to a temperature above −56.6°C, to prepare and store in said bottom structure of the said column, liquid chlorine of reduced carbon dioxide content;
   said gaseous feed mixture containing 20 to 90% by volume of $Cl_2$ and 10 to 80% by volume of $CO_2$, and said liquid chlorine stored in said bottom structure being subjected to temperature control within the range of 0° to 15°C to substantially release therefrom the $CO_2$ dissolved therein.

2. The method as claimed in claim 1 wherein said gaseous mixture is a gaseous mixture of a $Cl_2$–$CO_2$ binary system at a $CO_2$ concentration of 10 – 80% by volume.

3. The method as claimed in claim 1 wherein said gaseous mixture contains 20 to 90% by volume of $Cl_2$, 10 – 80% by volume of $CO_2$ and at least one component selected from the group consisting of $N_2$, $O_2$ and CO, and said rectification column is operated at an inner pressure of 4 to 8 atm. absolute as measured at a compressor provided before said rectification column.

4. The method as claimed in claim 1 wherein said rectification column has a number of theoretical plates of at least three.

* * * * *